Oct. 31, 1961    G. STRELAKOS, JR    3,006,586
KITE-DISPENSED TOY
Filed April 27, 1959    2 Sheets-Sheet 1
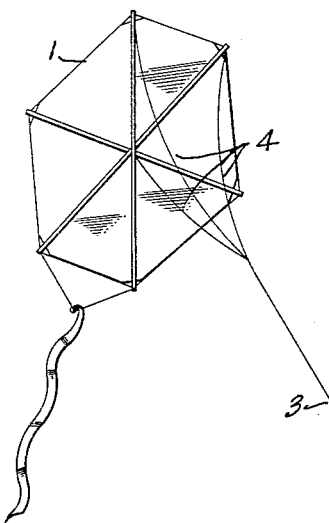
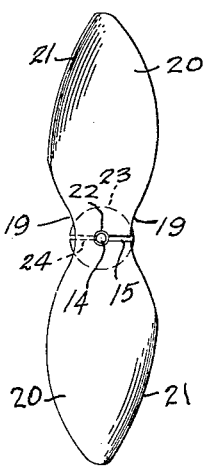
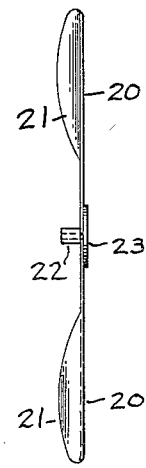
Fig.8.    Fig.9.
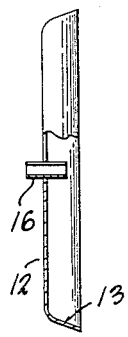
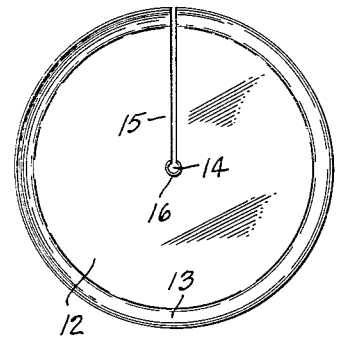
Fig.4.    Fig.5.
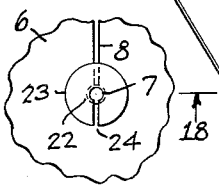
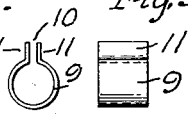
Fig.2.    Fig.3.
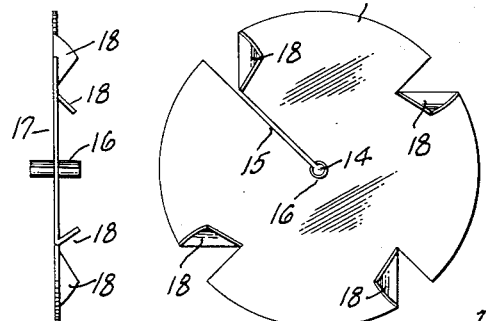
Fig.12.    Fig.10. Fig.11.
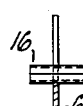
Fig.7.
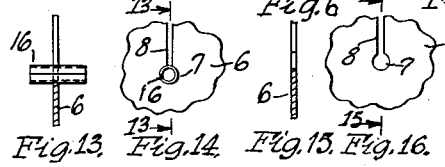
Fig.17. Fig.18.
Fig.19.    Fig.1.
Fig.6. Fig.15.
Fig.13. Fig.14. Fig.15. Fig.16.    Fig.20.
INVENTOR
George Strelakos Jr.
BY
Wooster, Davis & Cifelli
ATTORNEYS Oct. 31, 1961    G. STRELAKOS, JR    3,006,586
KITE-DISPENSED TOY
Filed April 27, 1959    2 Sheets-Sheet 2
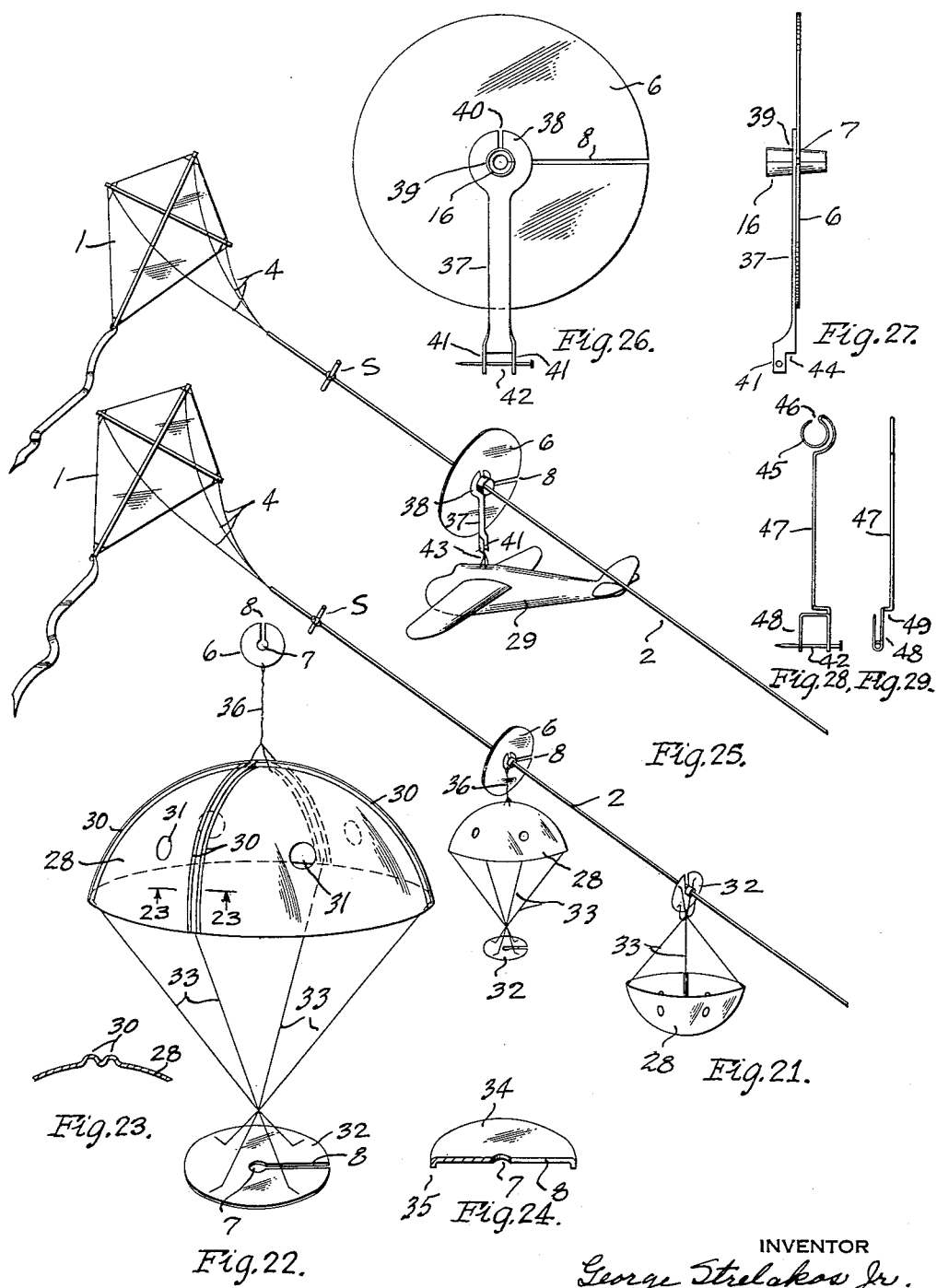
INVENTOR
George Strelakos Jr.
BY
Wooster, Davis & Cifelli
ATTORNEYS

United States Patent Office 3,006,586
Patented Oct. 31, 1961

3,006,586
KITE-DISPENSED TOY
George Strelakos, Jr., 784 Atlantic St., Stamford, Conn.
Filed Apr. 27, 1959, Ser. No. 808,992
3 Claims. (Cl. 244—155)

This invention relates to a kite-dispensed toy, and has for an object to provide a toy which may be placed on a kite string when in flight, and will be carried up the string to the kite by wind action, and during its travel along the strip may also be rotated by action of the wind.

It is also an object to provide a toy of this type which, when it reaches a position adjacent the kite or at any other determined position along the string, may be automatically released from the string and will drop with a floating retarded action to the ground.

action to the ground.

It is a further object to provide a toy of this type in which these actions may be secured with different forms of the toy.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In these drawings:

FIG. 1 is a view showing a kite in flight with the simplest form of the device travelling up the string thereof;

FIG. 2 is a side view of the spinner of FIG. 1 on a larger scale;

FIG. 3 is an edge view thereof;

FIG. 4 is a partial edge view and partial section of a modified form of spinner;

FIG. 5 is a side view thereof looking from the right of FIG. 4;

FIG. 6 is a side view of another form of spinner;

FIG. 7 is an edge view thereof;

FIG. 8 is a side view of still another form of spinner;

FIG. 9 is an edge view thereof;

FIG. 10 is an end view of a center bearing which may be used with any of the different types of spinners;

FIG. 11 is a side view thereof;

FIG. 12 is a side view of the central portion of a spinner showing one form of bearing in use thereon;

FIG. 13 is a section of the center portion of a spinner with another form of bearing, the section being substantially on line 13—13 of FIG. 14;

FIG. 14 is a side view of the central portion of a spinner using the bearing sleeve of FIG. 13;

FIG. 15 is a sectional view of the central portion of a spinner susbtantially on line 15—15 of FIG. 16;

FIG. 16 is a side view of the central portion of a spinner looking from the right of FIG. 15;

FIG. 17 is an end view of another form of bearing which may be used on the spinners;

FIG. 18 is a section of a portion of a spinner showing the bearing of FIG. 17 applied thereto and in elevation;

FIG. 19 is an end view of another form of center bearing which may be used with this spinner;

FIG. 20 is a section of a portion of a spinner with this bearing applied thereto;

FIG. 21 is a view of a kite in flight showing modified forms of the toy travelling up the string thereof;

FIG. 22 is a perspective view of the toys of FIG. 21;

FIG. 23 is a detail section substantially on line 23—23 of FIG. 22;

FIG. 24 is a section of a modified form of platform which may be used with the form of FIGS. 21 and 22;

FIG. 25 is another view of a kite in flight showing a modified toy travelling up the string thereof;

FIG. 26 is a side view of the carrier for the toy of FIG. 25;

FIG. 27 is an end view thereof;

FIG. 28 is a side view of a modified form of carrier for the toy of FIG. 25, and FIG. 29 is an edge view thereof, looking from the right of FIG. 28.

Referring first to FIG. 1, a kite of any suitable form is shown at 1, controlled in its flight by a suitable string, comprising a section 2 of a suitable size diameter, and a shorter section 3 of a smaller diameter adjacent the kite and connected to the kite by a series of shorter strings 4. The so-called strings may be either the usual fiber strings or wires, and the term "string" is therefore used in the specification and claims to mean either the fiber type of string or the fine wire type, or they could be of any other suitable material. At its lower end the string may be wound on a suitable spool 5 or it could be anchored to any other suitable device to facilitate holding, or it could be tied to the person of the user. Shown travelling up the string is a spinnner toy 6, in its simplest form a circular, substantially flat disk of any suitable thin sheet material, such as thin fiber board, cardboard, fairly heavy paper, plastic, metal, or similar material. It is provided with a central opening 7 which is of somewhat larger diameter than that of the larger string 2, and leading from this central opening or hole in the disk to the rim or outer periphery thereof is a narrow slot 8. This slot is of a width somewhat less than the diameter of the larger string 2 and somewhat greater than the diameter of the smaller string 3, so that when travelling along the larger string 2 it may rotate on it and slide along it under action of the wind without becoming disconnected or dropping from the string, but when it reaches the smaller diameter string 3 its rotating movement will bring the slot 8 into a position above the string and in alignment therewith and will therefore permit the disk, or that is, the spinner, to disconnect itself and drop from the string 3, and it will float slowly to the ground. It may have different actions or motions during this floating movement, depending on the shape of the spinner. If preferred, the opening 7 may be unlined, as shown in FIGS. 15 and 16, thus the material itself forming the bearing on the string, or if preferred, a somewhat longer bearing may be provided in this opening, as shown in FIGS. 2, 3, 10 and 11. This bearing member may be a short tubular section 9 formed from a piece of sheet material to fit in the opening 7 and slit at one side as indicated at 10, with short longitudinal flanges 11 on opposite sides of this slit. This may be inserted in the opening 7 by sliding it into the opening, or it could be compressed somewhat, with the flanges 11 lying at the opposite sides of the entrance from the opening into the slot 8, as shown in FIG. 2. This provides a longer bearing for the spinner on the string and helps to retain it at more nearly a right angle to the string as it travels up the string and rotates thereon.

Examples of other forms of spinners which may be used are shown in FIGS. 4 to 9. In the form of FIGS. 4 and 5 the spinner is of general dished shape, comprising a circular substantially flat bottom wall 12 with a laterally extending rim 13. The disk or bottom portion 12 is provided with an opening or hole 14 corresponding to the hole 7 of the disk, and with a channel 15 leading from this hole to the periphery of the spinner, the hole 14 being of a diameter somewhat larger than that of the large diameter string 2, while the slot 15 is of somewhat less width than the diameter of this string and somewhat wider than the diameter of the smaller string 3 so that this spinner will slide up the string 2 and rotate thereon during its sliding movement, until it reaches the smaller string 3, when it will disconnect itself and drop from this string, as described in connection with the form of spinner shown in FIGS. 2 and 3. The dished or cup-shaped member catches the wind and gives a somewhat more rapid action to the spinner both in sliding along the string and rotating thereon. It has been found that even though the disks are not formed with separate or extra surfaces to coact with the wind, even with plain surfaces they will rotate on the string as well as slide along it. A tubular bearing 16 may be provided in the hole 14 slotted on one side in alignment with the slot 15 to permit the spinner to drop from the smaller string 3, or the fit of the sleeve 16 in the hole may be loose enough or such that when the sleeve engages the strings 4 or a stop S in the string, as shown in FIGS. 21 and 25, the disk will rotate or slide along the sleeve and as it moves off the upper end thereof will detach itself and drop from the string as above described. As the sleeve 16 is larger than the string it slides freely along the string with practically no friction. It therefore requires very little friction to retain it in the discs 6, 12, 17 or any of the other discs. Also there is practically no wind pressure on the tube and the much greater wind pressure on the disc will therefore slide it along and off the tube after this tube is stopped by the strings 4 or stop S. Still further, due to the action of the wind the parachute will not remain vertical as shown in FIG. 21, but will be in a more or less horizontal position extending toward the kite and will also be pulling on the disc to assist in pulling it off the sleeve. It will be understood there is considerable activity going on with the chute bouncing or bobbing up and down and to the right and left. This is also true with the disc. This activity together with the force of the wind exerted on chute and disc effectively separates the disc from the tube or sleeve, and after they separate the sleeve may slide backwardly as the string is always at a steep incline. The sleeve, being a split sleeve, may have sufficient tendency to expand to provide sufficient grip or friction in the hole in the disc for the sliding action of the sleeve along the kite string, but not enough to prevent separation of the disc from the sleeve by rotation or sliding off the sleeve under action of the wind. Friction against stop S or the slot in the sleeve may stop the sleeve from rotating, but it is not necessary that it be stopped as the disc will slide off it in any case.

Additional means may be provided on the spinner to coact with the wind to secure more rapid and active action as the spinner travels along the string. Such a device is shown in FIGS. 6 and 7. This spinner comprises a disk 17 having the same opening 14 and 15 leading therefrom to the rim of the disk as is employed in the form of FIGS. 4 and 5, and it also may have the same tubular bearings 16 in the hole 14. At suitable points adjacent its outer periphery this disk is cut radially from its outer periphery inward toward the center, and then the portion at one side of the cut is bent laterally, forming an inclined wing or lug 18. These may be inclined in any suitable or desired angle and also take different shapes, but by the inclined positions may coact with the wind to secure more active and rapid action of the spinner and disk either as it travels along the kite string, or is held in one position against movement along the strings.

In FIGS. 8 and 9 is shown another form of spinner which may be used, which is generally in the form of a disk, but instead of being circular is formed with concavo-convexly curved opposite side edges 19, thus providing diametrically opposite blades 20 which may be curved laterally on one edge, as shown at 21, to form vanes cooperating with the wind to rotate the device as it travels along the string. Its flat central portion is provided with a hole corresponding to the hole 14 of the other form, together with the narrow slot 15 for release from the string 3, as previously described. This hole may be lined with a similar bearing shown at either 9 or 16, it may be a headed sleeve 22 with a head 23 on one side of the spinner. This may be turned so the slot in the sleeve and the head 23, as shown at 24, is out of alignment with the slot 15, so that the spinner will not drop from the string until it reaches the strings 4 on the kite, or a stop in the string arresting movement along the string, such, as for example, as a transverse pin S shown in FIGS. 21 and 25. At this point the sleeve 22 will stop rotating by being held by the strings 4 or the pin S and the spinner will turn on the sleeve 22 to bring slot 24 into alignment with the slot 15, and permit the spinner to drop from the string. This type of center sleeve for the spinner is shown in FIG. 12 and may be used on any of the forms of spinner shown, in place of the sleeves 9 or 16, or similarly, these sleeves 9 or 16 could be used in the spinner of FIGS. 8 and 9. If it is desired that the spinner, after reaching the vicinity of the kite, be retained on the string and not released therefrom, but be kept on the string and permitted to rotate thereon for display purposes, one side of the head 23 of the sleeve 22, as shown in FIG. 17, may be provided with glue, as indicated at 25, which, by moistening before placing it in the spinner, may be attached to the spinner and held against turning in the hole in the spinner and thus prevented from dropping from the string.

In the form of center bearing shown in FIGS. 19 and 20, a split sleeve 26 similar to that shown at 16, may have a disk 27 thereon to engage one side of the spinner disk to definitely hold the sleeve at right angles to the spinner disk and reduce the liability of the disk tipping out of the plane at right angles to the axis of the sleeve.

In FIGS. 21 to 29 is shown how the disk may be used to carry other forms of toys, such, for example, as a parachute 28 or a toy airplane 29. The parachute may be of fabric or a thin ribbed plastic provided with ribs 30 to stiffen it and prevent its collapsing, and it maye be provided with holes 31 for passage of air to stabilize the parachute in descent, and a platform 32 or other device maybe suspended from the parachute by cords or strings 33, which may be the standard type or could be wires or strips of plastic having a certain amount of stiffness to prevent their folding or collapsing, and thus becoming entangled either during the movement of the device up the kite string or the descent in the air after becoming detached from the string. These strings may be glued at their opposite ends to the canopy part 28 of the parachute and to the platform 32. Instead of a flat type of disk as shown in FIG. 22, this platform could be the somewhat dished type as shown at 34 (FIG. 24) provided with a peripheral flange 35 and having the opening or hole 7 and slot 8 leading therefrom the same as the other forms. The parachute may be suspended from the kite cord, either by a disk of any of the types shown, such as the disk 6, from which it is suspended by suitable means, such as cords 36, which provide a carrier for the parachute, or it could be suspended by the type of carrier shown in FIGS. 25 and 29, or if preferred it could be suspended in reversed position by the platform 32 or 34, or other types of disk or spinner, as shown at the lower right hand part of FIG. 21.

As above suggested, different types of airborne toys may be suspended from the kite string and travel along the string by means of a suitable carrier connected to the disk or spinner either directly or through the bearing sleeve, as shown in FIGS. 25 to 29. In FIGS. 25 to 27 the spinner is shown of the plain disk type 6, provided with the central opening 7 and radially extending slot 8 leading therefrom and having the tubular split bearing 16 in this opening, which may be either straight or tapered, and suspended from this bearing is a carrier 37 which may be a flat strip of material, such, for example, as cardboard, plastic or similar material, provided with a circular head 38 at its upper end provided with an opening 39 to receive the tubular bearing sleeve and provided with radial slot 40 leading from this opening to the rim of the head corresponding to the slot 8 in the disk. At its lower end this carrier is forked as indicated at 41 with a transverse pin 42 for supporting an airborne toy such, for example, as a toy airplane 29 provided with suspending means 43 by means of which it may be suspended from the pin 42. This device will travel up the kite string under action of the wind, and the disk or spinner may or may not rotate, but normally will turn on the sleeve 16, or the sleeve may turn with the disk in the carrier head 38. If this is used on a kite string of the two different diameters as shown in FIG. 1, this disk and carrier will be released from the string in the same manner as the disk type of spinner, as shown in FIGS. 1 to 20. It is, however, to be understood the disks or spinners of FIGS. 1 to 20, as well as the disk carrier of FIGS. 21 to 29, may be used with the type of kite string shown at 2, FIGS. 21 and 25, omitting the section of small string 3 used in FIG. 1 and in which the tie strings 4 of the kite are connected directly to this string 2. These strings 4 may be used also as a stop to limit upward movement of the spinner or carrier as they are spread from each other between the string 2 and the kite, or movement of the spinner or carrier may be limited by the stop S. When movement of the spinner or carrier is limited by either means, if it is being operated with one of the tubular bearings 9, 16, 22, 26, the spinner will slide off this tube and onto the string, and as it turns to bring the slot 8 or 15 into alignment with the string will become detached and permit the airborne toy, either the parachute 28 or the airplane, to descend slowly through the air. The carrier 37 at its lower end is provided with a shoulder 44 offset from the pivot pin, which, when the airplane is suspended from it, is toward the nose or forward end of the plane and will prevent the carrier dropping forwardly, to insure that it drops backwardly toward the rear.

A modified form of carrier to take the place of carrier 37 is shown in FIGS. 28 and 29 formed of a piece of wire which is bent into a loop 45 at its upper end to embrace the sleeve 16 and provided with a gap 46 corresponding to the slot 40 for releasing the carrier from the string. This carrier has a depending body portion 47 and is bent at its lower end to form a forked portion 48 to receive the suspending pin 42. It is offset at 49 to correspond with the stop shoulder 44 of the first form.

It will be seen from the above that this toy comprises a simple and effective spinner for a child to use while flying a kite, as means for travelling along the kite string from the child to the kite, and it may be formed to either disconnect itself from the kite automatically and drop slowly from the kite with a spinning action, or if preferred it may be retained on the string close to the kite and keep spinning in this position. It may be decorated with different colors or designs for different effects in its spinning action, and also may be used as a carrier for carrying other toys to a position near the kite and be automatically released to then float slowly through the air. In any of the disks or spinners it may be applied to the string by either threading the end of the string through the hole in the center of the spinner or disk, or the portions of the disk on opposite sides of the radial slot 8 or 15 may be bent laterally in opposite directions to open the slot sufficiently to pass the string through it into the central opening in the disk or spinner and into the bearing sleeve when one is used. The spinner will have sufficient resiliency and stiffness to return to and retain its normal shape and condition. In the use of a string of one size only, as in FIGS. 21 and 25, the release slot in the spinner disc would be of a width somewhat greater than the diameter of the string so as to be disconnected from the string after sliding off the bearing sleeve after the sliding movement of the sleeve is stopped by either the strings 4 or the stop S. The slot in the disk is wider than the diameter of the smaller string 3 so the spinner can disconnect itself after sliding movement off the bearing sleeve when this sleeve is stopped by the strings or wires 4 connected to this string 3.

Having thus set forth the nature of my invention, I claim:

1. In combination a kite, a string controlling flight thereof, a spinner including a disk provided with a central hole and a slot leading from the hole to the rim of the disk of a width somewhat greater than the diameter of the string, a bearing sleeve for the disk of a size somewhat larger than the string and located in the hole in the disk with a fit permitting turning and sliding movement of the disk on the sleeve should sliding movement of the sleeve on the string be arrested, and stop means connected to the string at a point spaced from the kite in position to arrest sliding movement of the sleeve and cause the disc to slide off the sleeve.

2. In combination, a kite, a string controlling flight thereof comprising portions of two diameters arranged with the smaller diameter adjacent the kite, and a toy including a member of thin sheet material provided with a central hole of somewhat larger diameter than that of the larger diameter string and a slot leading from said hole to the outer edge of the member of a width less than the diameter of the larger string to retain the member on the string when the larger string is in the hole, and said slot of a width wider than the diameter of the smaller string to permit release of the member when the smaller string is in the hole, said member being of a size to provide sufficient surface area in a plane at right angles to the string whereby pressure of the wind flowing toward the kite will cause the member to slide along the larger string to the smaller string to be released thereby, and a tubular bearing sleeve in the hole in the member of normally only slightly larger diameter than the hole whereby the sleeve is retained in the hole during normal movement of the member on the string and the member may have relative movement on the sleeve should the sleeve engage an obstruction on the string.

3. In combination a kite, a string controlling flight thereof comprising portions of two diameters arranged with the smaller diameter adjacent the kite, and a toy including a member of thin sheet material provided with a central hole of somewhat larger diameter than that of the larger diameter string and providing a bearing by which the member may rotate on the string as it travels along the string, said member also provided with a slot leading from said hole to the outer edge of the member of a width less than the diameter of the larger string to retain the member on the string when the larger string is in the hole, and said slot of a width wider than the diameter of the smaller string to permit release of the member when the smaller string is in the hole, and said member is a spinner provided with driving surfaces inclined to the plane of the member to coact with the wind to rotate said member on the string.

References Cited in the file of this patent

UNITED STATES PATENTS

| | | |
|---|---|---|
| 985,301 | Terry | Feb. 28, 1911 |
| 2,750,136 | Stracke | June 12, 1956 |

FOREIGN PATENTS

| | | |
|---|---|---|
| 17,800 | Great Britain | 1889 |
| 23,027 | Great Britain | 1902 |